United States Patent [19]

Westwood

[11] Patent Number: 5,122,031

[45] Date of Patent: Jun. 16, 1992

[54] WIND-DRIVEN PUMP

[76] Inventor: Kenneth D. Westwood, 2114 Highway 6-50, Grand Junction, Colo. 81505

[21] Appl. No.: 608,579

[22] Filed: Nov. 2, 1990

[51] Int. Cl.$^5$ .............................................. F03D 9/00
[52] U.S. Cl. ...................................... 415/2.1; 417/334
[58] Field of Search ................. 416/9; 415/2.1, 4.1, 415/4.2–4.5, 905, 907, 908; 417/334, 35

[56] References Cited

U.S. PATENT DOCUMENTS

| | | | |
|---|---|---|---|
| 544,594 | 8/1895 | Saundersen | 416/9 |
| 546,710 | 9/1895 | Rogers | 416/9 |
| 708,620 | 9/1902 | Bromley | 417/35 |
| 1,417,738 | 5/1922 | Wilson | 417/35 |
| 3,957,397 | 5/1976 | Wendler | 417/35 |
| 4,184,807 | 1/1980 | Berg | 417/334 |
| 4,211,126 | 7/1980 | Sutz | 417/334 |
| 4,784,570 | 11/1988 | Bond | 417/334 |

Primary Examiner—John T. Kwon
Attorney, Agent, or Firm—Richard W. Hanes

[57] ABSTRACT

A windmill driven pump having rotatable windmill vanes attached to a turning shaft. A disk is eccentrically mounted on the shaft so that both the disk and shaft rotate along with the vanes. Bearings selectively cooperate with the disk to transfer the rotational movement of the disk to a reciprocally movable beam. A pulley system transfers the movement of the beam to a sucker rod for a pump. A locking device is also provided which can prevent the bearings from cooperating with the disk and thus disengage the pump from the rotation of the windmill.

12 Claims, 4 Drawing Sheets

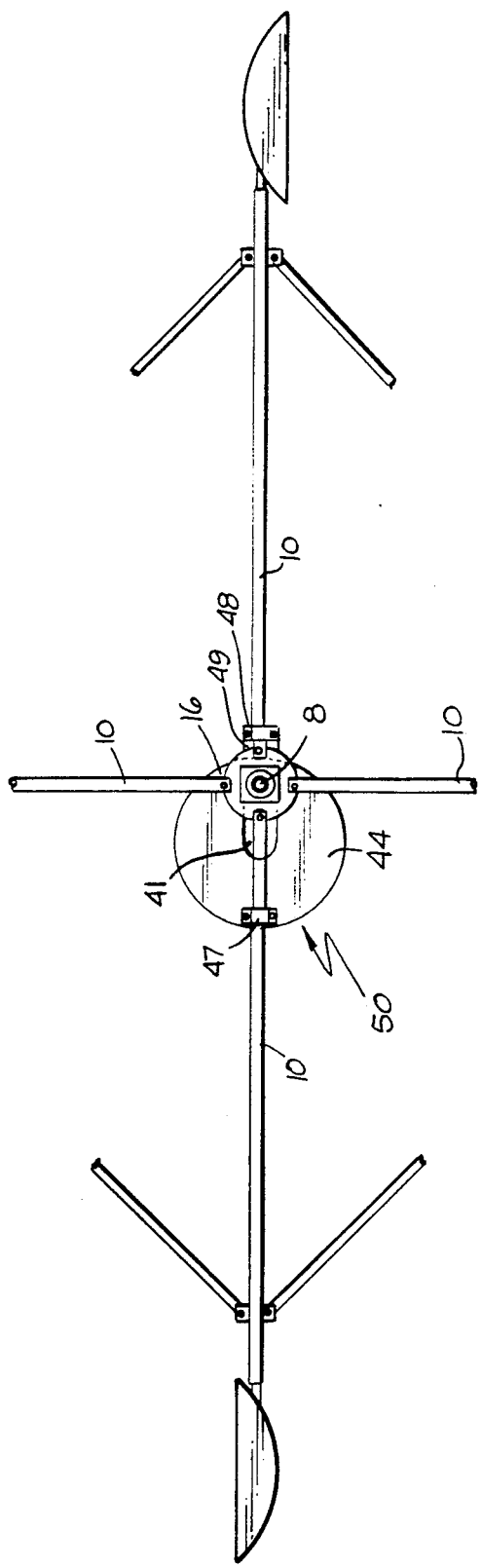
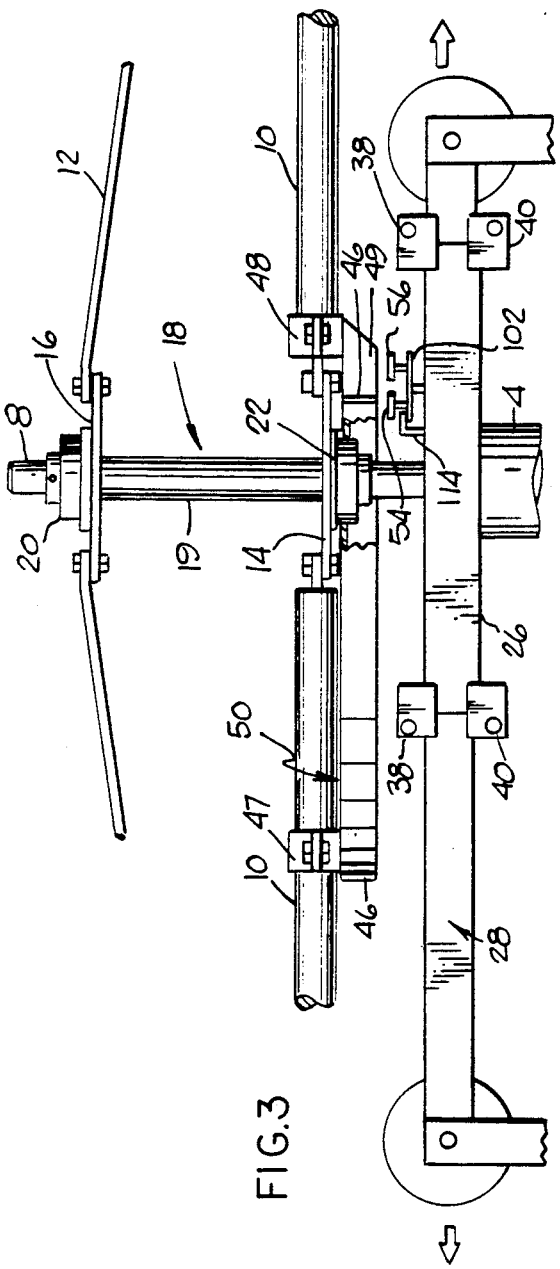
FIG. 2
FIG. 3

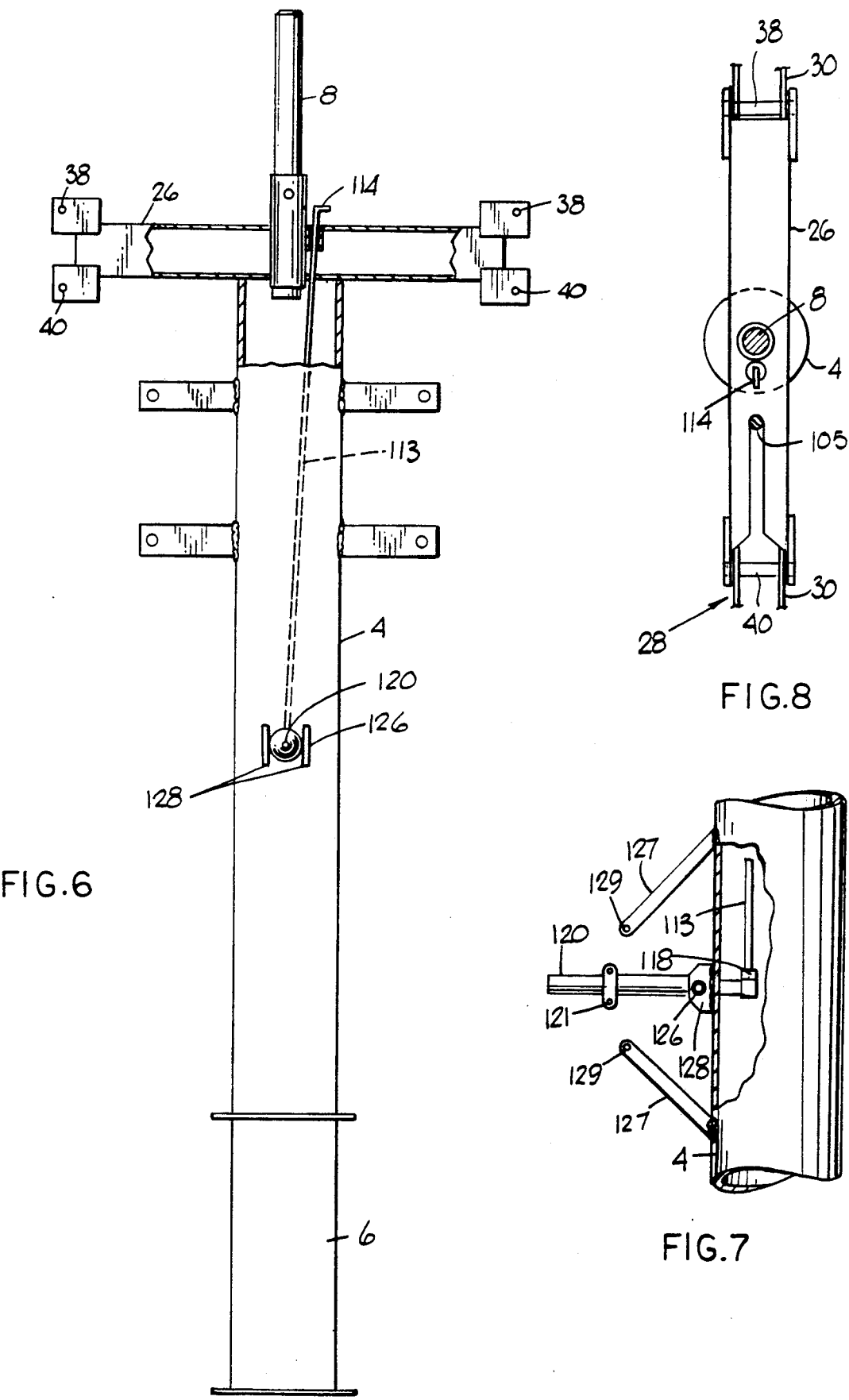

WIND-DRIVEN PUMP

BACKGROUND OF THE INVENTION

The present invention relates to a wind driven mechanism for operating positive displacement pumps through a sucker rod.

The prior art has long known of windmills which rotate with the energy of the wind and which in turn operate the upward and downward movable rod chains which operate the positive displacement pumps in the well hole. The mechanism used by the prior art to convert the rotary motion of the wind vanes to reciprocating motion of the rod string however is inefficient and requires ten or more mile per hour winds to adequately turn the wind vanes before sufficient power can be produced to pump fluid. The present invention is directed to a novel apparatus for converting the rotary motion of the wind sails of a vertical shaft wind turbine system into reciprocating motion that can efficiently pump fluid in a five mile per hour wind.

SUMMARY OF THE INVENTION

The windmill of the present invention comprises an upright support column which houses a rotatable shaft carrying a superstructure of circumferentially disposed spaced apart sails. As the sails respond to the wind, the superstructure and its supporting shaft are rotated. A circular, inverted saucer shaped member having a peripheral flange is eccentrically mounted for rotation with the shaft, where the general plane of the saucer is perpendicular to the shaft. The flange of the eccentric member bears against a follower which is carried by a beam, slidable reciprocally in a cradle rigidly mounted on the supporting column. As the eccentrically mounted saucer rotates with the turning shaft, the beam reciprocates back and forth along an axis perpendicular to the rotating shaft and a flexible cable attached to the beam and trained through a series of pulleys causes a sucker rod, to which the cable's other end is attached, to move up and down, operating a down hole positive displacement pump. A second cable attached to the other end of the reciprocal beam is trained through a second series of pulleys and is attached to a counterweight which is raised as the sucker rod descends into the well. As the sucker rod is raised from the well, the counterweight descends, releasing its energy to assist in the raising of the pumped fluid, in a known manner. The windmill could also be used to drive two wells. The sucker rod a second well would replace the normal counterweight of the windmill on the first well. This would be most effective in a shallow pumping situation where the lift of the sucker rod would be less than approximately 50 feet.

The primary object of the present invention is to provide an efficient mechanism for transforming even low velocity wind into water pumping capacity.

A second object of the invention, related to the first, is to provide apparatus with high mechanical advantage to effectively utilize low wind speed.

A more specific object of the apparatus is to provide an eccentric member whose wind-driven rotation causes reciprocating motion of a slidable beam in one plane which, through a cable and pulley arrangement, provides reciprocating motion to a sucker rod and a synchronized counterweight in a plane perpendicular to the first mentioned plane.

Another specific object of the apparatus of the present invention is to provide a novel swivel bearing which will allow the eccentric follower to stay in contact with the periphery of the eccentric throughout its circular revolution.

A further object is to provide a unique de-coupling device which works in conjunction with the eccentric follower to disengage the pump from the rotation of the windmill.

Other and still further object, features and advantages of the invention will become apparent upon a reading of the following detailed description of a preferred form of the invention, taken in conjunction with the accompanying drawings in which:

DESCRIPTION OF THE DRAWINGS

FIG. 2 is a fragmentary top view of the windmill of FIG. 1.

FIG. 3 is a fragmentary enlarged detail side view showing the reciprocating beam of the windmill and the associated driving structure.

FIG. 6 is a partial cross-sectional view of the mast showing the latch rod.

FIG. 7 is an enlarged detail view of the handle mechanism for the latch rod shown in FIG. 6, with portion broken away and shown in cross-section.

FIG. 8 is a top view of the cross arm which supports the traveler beam, shown fragmentarily and also showing the top shaft and the bearing support shaft in cross section.

DETAILED DESCRIPTION OF THE INVENTION

Figure 1:
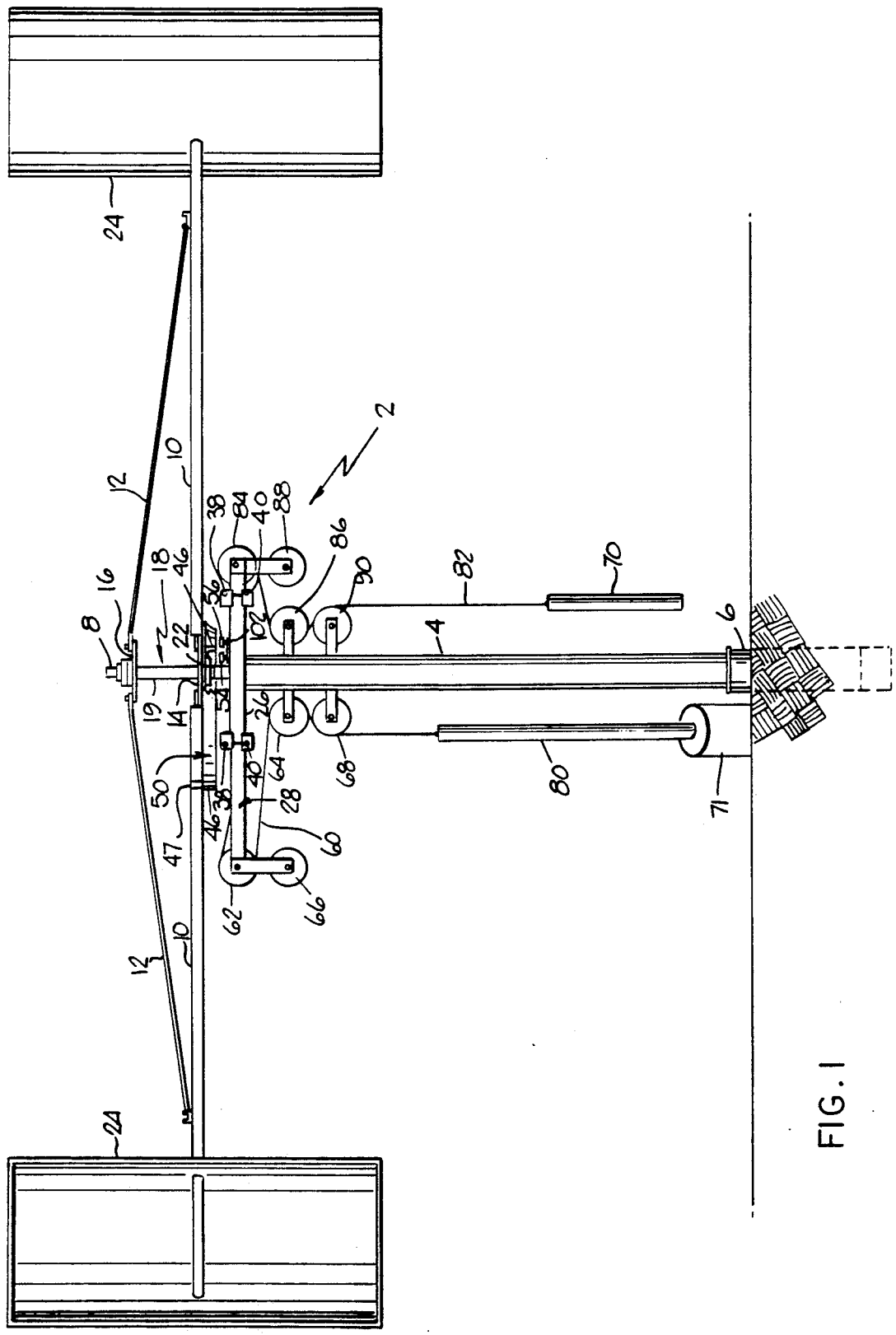
FIG. 1 is a side elevational view of the windmill for driving a pump in accordance with the instant invention in its disengaged position where the sucker rod of the pump is stationary.
Figure 4:
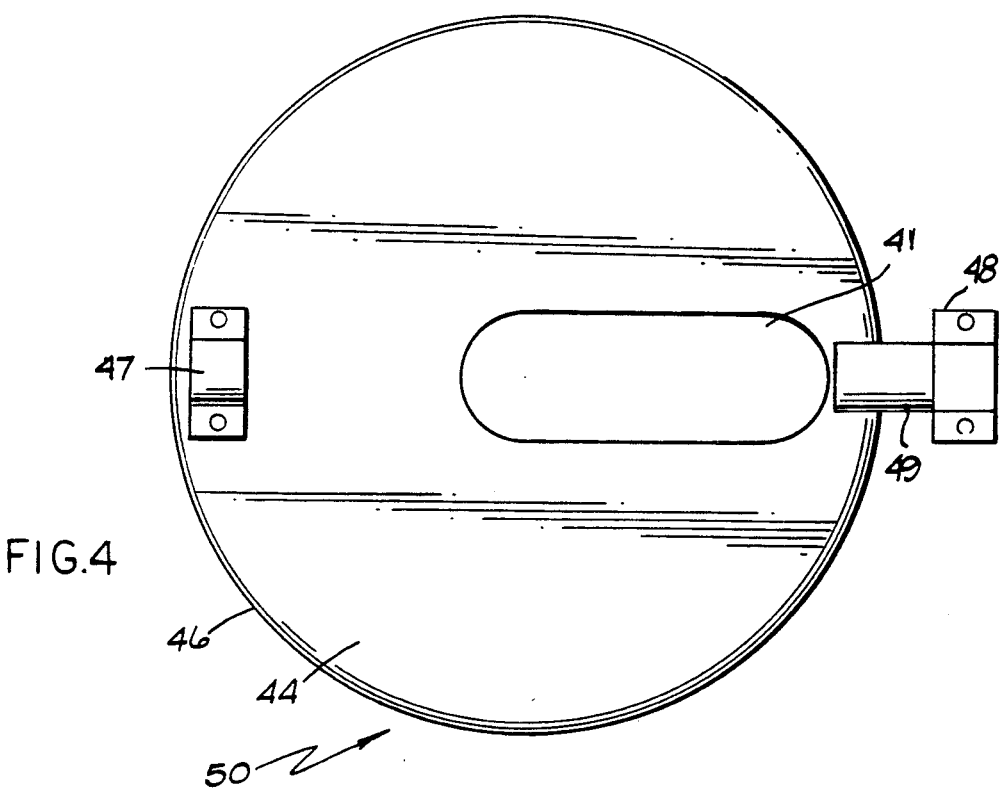
FIG. 4 is a top view of the eccentric showing a slot for adjustment.

Referring first to FIG. 1, the windmill 2 of the present invention is seen to be supported by a vertically standing pipe mast 4 set into a supporting anchor 6 imbedded in the earth. The pipe mast 4 mounts at its top a rigid shaft or axle 8 to which are rotatably attached a plurality of radial sail arms 10 and a like plurality of sail arm tension bars 12. In the illustrated embodiment, four sail arms 10 are shown (FIG. 2) though another number could be provided if desired. The sail arms 10 and the sail tension bars 12 are bolted to the lower and upper flanges 14 and 16 respectively of a spool 18, the hollow central tubular member 19 of which surrounds the shaft 8 as shown in FIG. 3. Upper and lower bearings 20 and 22 are bolted to the flanges 14 and 16 and are carried by the shaft 8.

A plurality of sails 24 are carried by the sail arms 10 and in response to the wind will cause the sail arms 10, the sail tension bars 12 and the spool 18 to rotate around the axle formed by the shaft 8.

Rigidly secured to the top of the pipe mast 4 and below the level of the sail arms 10 is a rigid cross arm 26 which may be constructed of rectangular tubing. The cross arm 26 provides telescopic support for a sliding a reciprocally movable traveler beam 28 which, in the preferred embodiment, comprises a pair of parallel side plates, one of which is shown at 30 in FIG. 5, interconnected by spacers (not shown). The traveler 28 moves between and is partially supported by pairs of guide rollers 38 and 40 disposed at each end of the cross arm 26. The traveller moves substantially perpendicular to the shaft 8.

The rotary motion of the sail arms 10 is converted into reciprocating movement of the traveler 28 by means of a circular disk 44 having a downwardly extending circumferential flange 46. The disk 44 is mounted eccentrically with respect to the shaft 8 and is attached to the sail arms by means of pipe clamps 47 and 48. The lower half of the clamp 47 is welded or otherwise firmly fixed to the periperal area of the disk 44 while the lower half of the other clamp 48 is welded to an extension bracket 49 which is fixed to the disk diametrically from the clamp 48 is welded to an extension bracket 49 which is fixed to the disk diametrically from the clamp 47. The sail arms nest into the bottom halves of the clamps and the top halves of the clamps 47 and 48 also embrace the sail arms so that when the clamp halves are bolted together the sail arms are rigidly attached to the disk 44 to impart rotation to the disk as the sail arms are turned by the wind.

Figure 5:
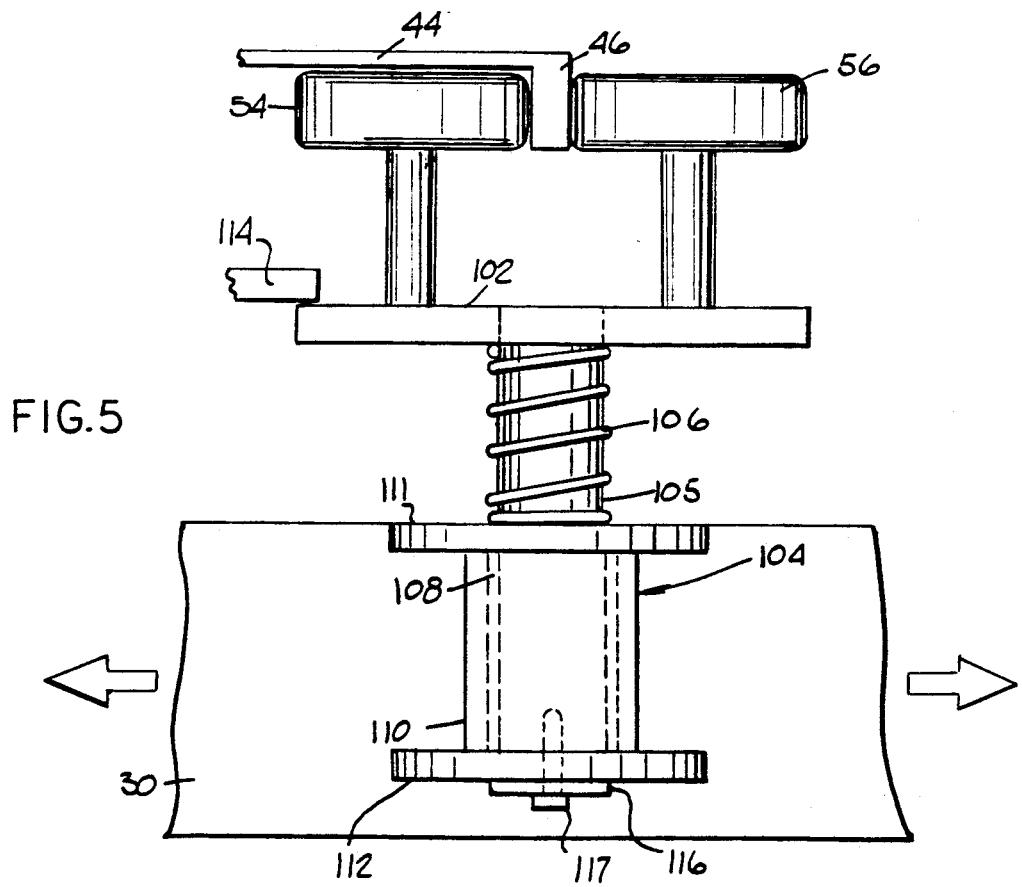
FIG. 5 is an enlarged detail side view of the follower which engages the eccentric flange.

The length of the stroke of the reciprocating traveler 28 can be varied by adjustment of the eccentric orientation of the disk 44 with respect to the shaft 8. As best seen in FIGS. 2 and 3, the center of rotation of the disk 44, which is the longitudinal axis of the shaft 8, may be selectively positioned anywhere within the length of the diametric slot 41 in the disk and the adjustability of the pipe clamps 47 and 48 allow for selective positioning of the disk with respect to the sail arms 10. This adjustment can vary with the height of the windmill and length of cable used to achieve desired movement of a pump sucker rod as will be later explained in greater detail. The subassembly comprising the disk and its integral flange 46 will hereinafter be referred to as the eccentric 50. The flange 46 of the eccentric 50 is disposed for the operational mode of the windmill, as shown in FIG. 5, between two embracing roller bearings 54 and 56 which are carried by the traveler 28 intermediate its ends. As the eccentric 50 is rotated by the spool 18 and the attached sail arms 10 the locus of the point of contact between the roller bearings 54 and 56 and the eccentric's flange 46 will trace a path back and forth along the longitudinal axis of the cross arm 26, causing the traveler 28 to move in a reciprocating mode back and forth telescopically within the cross arm 26. FIGS. 1 and 3 show the roller bearings 54 and 56 disengaged from the disk flange 46 as will be later explained. FIG. 5 shows the flange engaged by the bearings for producing reciprocal movement of the traveler beam 28.

The horizontal reciprocating motion of the traveler is advantageously used to raise and lower a sucker rod 80 which is attached to a well known positive displacement pump 71, such as would be found in a water well, for example. While several different arrangements could be used, depending on the location of the well with respect to the windmill and the mechanical advantage which is desired, one form of connection is shown in FIG. 1 where a wire rope cable 60 is secured at one of its ends to one end of the fixed cross arm 26. Cable 60 is then trained around a sheave 62 which is rotatably mounted on the end of the traveler beam 28 which is nearest to the end of the cross arm to which the cable end is attached. The cable then wraps around a sheave 64 mounted on the side of the pipe mast 4, then around a third sheave 68, which is also attached to the side of the pipe mast 4. From the third sheave 68, the cable 60 is connected to a sucker rod 80, attached to the positive displacement pump 71 in a well. An alternative arrangement, for additional mechanical advantage, would be for cable 60 to extend from sheave 64 around sheave 66, and then back to sheave 68.

The reciprocating motion of the traveler 28 lends itself well to the use of a counterweight 70. A second cable 82 is firmly attached to the opposite end of the fixed cross arm 26 and trained around a pulley 84 carried by the end of the traveler which is opposite to the end of the traveler which carries the sheave 62. An arrangement of pulleys 84, 86, 88 and 90 disposed and positioned similarly to the sheaves 62, 64, 66 and 68 respectively carries the cable 82 to its attachment with a counterweight 70. In a well known fashion as the sucker rod is being lowered into the well, the counterweight 80 is being raised by the force of the turning windmill. When the traveler 28 reverses its direction of motion and the sucker rod is withdrawn from the well the counterweight's descent provides additional energy to the traveler to assist in the raising of the loaded sucker rod.

One important aspect of the windmill of the present invention involves the structure used to disconnect the rotating sail and sail support assembly from the reciprocating follower. For that purpose attention is directed to FIGS. 5, 6 and 7. These drawings illustrate a mechanism for raising and lowering the roller bearings 54 and 56 so that the bearings can selectively be engaged or disengaged with the flange 46 of the eccentric 50, thus providing an operating link between the eccentric 50 and the traveler for terminating the operation of the sucker rod and counterweight system. As shown in FIG. 5, the roller bearings 54 and 56 are mounted for rotation on a plate 102 which is movably interconnected to a mounting bracket 104 fixed to one side 30 of the traveler beam 28. A sleeve 110 is carried by horizontal top and bottom plates 111 and 112, which plates interconnect the parallel sides of the traveler beam 28. Inside the sleeve 110 and extending into the plates 111 and 112 is a bushing 108 which surrounds a slidable shaft 105. The top end of the shaft 105 is fixed to the bearing mounting plate 102. As the traveler beam 28 reciprocates in the tubular support 26, the reciprocal movement of the shaft 105 is accommodated by a slot 108 in the top surface of the tube 26, as seen in FIG. 8. A compression spring 106 surrounds the shaft 105 and abuts the underside of the plate 102 and the top side of the interconnecting plate 111 through which the shaft 105 moves. A washer 116 is attached to the bottom of the shaft 105 by means of a bolt 117, the washer abutting the ends of the bushing 108 to limit the upward travel of the shaft 105, as normally biased by the spring 106. In the upper position, which is urged by the spring 106, the bearings 54 and 56 embrace the inner and outer sides respectively of the eccentric flange 46, as shown in FIG. 5, causing the rotation of the eccentric to move the traveler reciprocally. When the plate 102 is depressed downwardly against the normal biasing force of the spring 106 the bearings 54 and 56 are disengaged from the flange 46 and the traveler cannot follow the motion of the eccentric, as shown in FIGS. 1 and 3. The plate 102 is depressed or pulled downwardly by a bearing latch rod 113 (see FIG. 6) which is disposed within the pipe mast 4, except for the topmost hooked end 114 of the latch rod which protrudes from the interior of the pipe mast through an aperture in the top cover of the pipe mast. The elongated latch rod 113 is secured at its bottom end to a threaded coupling nut 118 (see FIG. 7) fastened to the interior end of a latch rod handle 120. The handle 120 is disposed radially of the cross section of the pipe mast 4 and protrudes from the side of the pipe mast where it is pivotally secured thereto by a pin 126 supported by a pair of ears 128 welded to the outside surface of the pipe mast. Pivoting the handle about its pin attachment 126 causes the end carrying the coupling nut 118 to move up and down which in turn causes the hooked end 114 of the latch rod to either depress or release the plate 102 which supports the eccentric engaging bearings. Brackets 127 having apertures 129 serve to secure the handle in its desired position. A pin (not shown) can pass through one of the apertures 129 and a corresponding aperture 121 on the handle to fix the handle in either its pivoted up or pivoted down position.

Although the above-described windmill apparatus has been used to drive a single pump with a counterweight for balance, it is understood that the counterweight could be replaced by an additional sucker rod and pump for dual pumping action. It is also understood that various well known modifications could be made to the above described apparatus based on the location of the pump to be driven and the mechanics to be achieved.

I claim:

1. A windmill comprising;
    support means carrying a rotatable shaft;
    a plurality of rotatable wind driven blades carries by truss means disposed within a plane and attached to said shaft;
    a disc attached to the truss means for rotation therewith, where the plane of the disc is parallel to the plane of the truss means and where the center of the disc is spaced apart from the axis of rotation of the shaft;
    reciprocally movable follower means operably coupled to the perimeter of the disc;
    means restricting the movement of the follower means to a path in a plane which passes through said shaft.

2. The apparatus of claim 1 and further comprising a reciprocally movable sucker rod for a pump, and means for translating the reciprocal movement of said follower means into reciprocal movement of said sucker rod.

3. The apparatus of claim 2 further comprising a movable counterweight and means carried by said follower means for interconnecting the said counterweight to the said sucker rod.

4. The apparatus of claim 1 further comprising means for adjusting the distance between the center of the disc and the axis of rotation of the power shaft.

5. The apparatus of claim 4 wherein said means for adjusting comprises a slot on said disk means for receiving said shaft.

6. The apparatus of claim 2 wherein said means for translating comprises at least one pulley attached to a first end of said follower means and cable means trained around said one pulley and attached to said sucker rod so that reciprocation of said follower means results in movement of said cable means and said sucker rod.

7. The apparatus of claim 3 wherein said means for connecting comprises a second pulley attached to a second end of said follower means opposite said first end and cable means trained around said second pulley and attached to said counterweight so that reciprocation of said beam results in movement of said counterweight cable means and said counterweight.

8. The apparatus of claim 1 wherein said means operably coupled to the perimeter of the disc comprises bearing means carried by said follower means and means for selectively attaching said baring means to said disc to translate rotation of said disc into reciprocation of said bearing means and said follower means.

9. The apparatus of claim 8 wherein said disk has a downturned edge for cooperating with said bearing means.

10. The apparatus of claim 8 wherein said means for selectively attaching comprises spring means biasing said bearing means against said disk.

11. The apparatus of claim 10 wherein said means for selectively attaching further comprises a latch rod for selectively urging said bearing means away from said disk against the bias of said spring means.

12. The apparatus of claim 11 comprising a handle attached to said latch rod, said handle having a first position wherein said latch rod urges said bearing means away from said disk and a second position wherein said latch rod is disengaged from said bearing means.

* * * * *